United States Patent [19]

Peelle et al.

[11] 4,291,307

[45] Sep. 22, 1981

[54] PLANAR ALPHANUMERIC DISPLAY

[75] Inventors: Thomas B. Peelle, Farmington Hill; Roland K. Kolter, Dearborn, both of Mich.

[73] Assignee: International Telephone and Telegraph Corp., New York, N.Y.

[21] Appl. No.: 22,085

[22] Filed: Mar. 19, 1979

[51] Int. Cl.$^3$ .................................................. G09F 9/32
[52] U.S. Cl. ................................ 340/756; 340/759; 340/765
[58] Field of Search ................ 340/756, 758, 759, 765

[56] References Cited

U.S. PATENT DOCUMENTS

| Re. 29,727 | 8/1978 | Fujita | 340/765 |
| 3,760,403 | 9/1973 | Kippenhan | 340/758 |
| 3,831,166 | 8/1974 | De Nardo | 340/765 |
| 4,044,280 | 8/1977 | Shulski | 340/759 |
| 4,142,182 | 2/1979 | Kmetz | 340/765 |

Primary Examiner—Marshall M. Curtis

Attorney, Agent, or Firm—James B. Raden; Marvin M. Chaban

[57] ABSTRACT

A display device for alphanumeric characters using a sixteen segment configuration for each character, eight segments in an outer ring and eight segments in an inner configuration. The segments are joined in an eight-by-two matrix which is multiplexed, there being two time intervals for each character. The display medium may be liquid crystal or any other known dual plane medium such as colloidal suspension. In one plane, the inner eight segments are multiplexed into one group, while a second group multiple extends to the external eight segments. In the other plane, each outer segment is connected in series with an inner segment to form eight segment pairs. To display a desired character, selected pairs in one plane are energized with either the inner or outer multiple during one time interval to illuminate all segments common to the selected pairs and the selected group. During a second time interval, other selected pairs are energized with the other group. Successive characters are driven sequentially.

3 Claims, 6 Drawing Figures

PLANAR ALPHANUMERIC DISPLAY

BACKGROUND OF THE INVENTION

Liquid crystal displays are, of course, known for numeric displays and alphanumeric displays. Multiplexing of such displays is also well-known as indicated by the article entitled—Multiplexing Liquid—Crystal Displays on pages 113-121 of Electronics Magazine (McGraw-Hill Publication) for May 25, 1978.

In that article, an approach to multiplexing a numeric character with its characteristic seven segment display is shown. It is also well-known that by applying the energizing voltage in pulses at a sufficiently high frequency to different segments, the pulsed segments appear to be continuously illuminated to the eye of a viewer. See U.S. Pat. Nos. 3,781,863 issued Dec. 25, 1973 to K. Fujita, and 3,945,001 issued Mar. 16, 1976 to G. Shimakawa.

Other two-plane displays using colloidal or fluid suspensions in place of the liquid crystal are also known as shown by U.S. Pat. Nos. 3,655,267 to Forlini as issued Apr. 11, 1972 and 3,708,219 to Forlini et al issued Jan. 2, 1973.

SUMMARY OF THE INVENTION

The present invention is directed to an improved alphanumeric display for use with a two panel light display in which the medium may be liquid crystal, colloid suspension or the like. Segments comprising a character are multiplexed in a two-step, eight-by-two pattern.

The pattern of segments for each character includes eight peripheral segments forming a rectangle of an outer group. Eight segments in a star burst pattern form the inner group. On one plate, the outer group segments are connected together. On the other plate, the segments are paired with a segment of the outer group paired with an adjacent segment of the inner group in each pairing. By energizing one group with selected segment pairs in one time frame and selected segment pairs and the other group during a second time frame, a complete alphanumeric set of characters may be formed.

It is therefore an object of the invention to provide a planar, two panel alphanumeric data display which may be multiplexed in a two interval, eight-by-two time multiplex sequence for characters in a multiple character display.

It is a further object of the invention to provide an alphanumeric display using two planar panels in which there are plural segments for each character superimposed on each panel, with the segments of one panel being grouped in multiple segment groups and with the segments on the other panel paired, and with a segment of each pairing including one segment from each group.

It is a still further object of the invention to provide a two panel planar display in which each character of the display includes segments on each panel in substantial alignment with segments on the other panel and in which the segments on one panel are grouped and the segments of the other panel are paired with one segment of a pairing in each group, and in which selected segments of one panel are electrically driven simultaneously with driving of said one group on the other panel, followed by a second driving of selected segments of said first panel with driving of said second group.

DETAILED DESCRIPTION OF THE DRAWINGS

Figure 1:
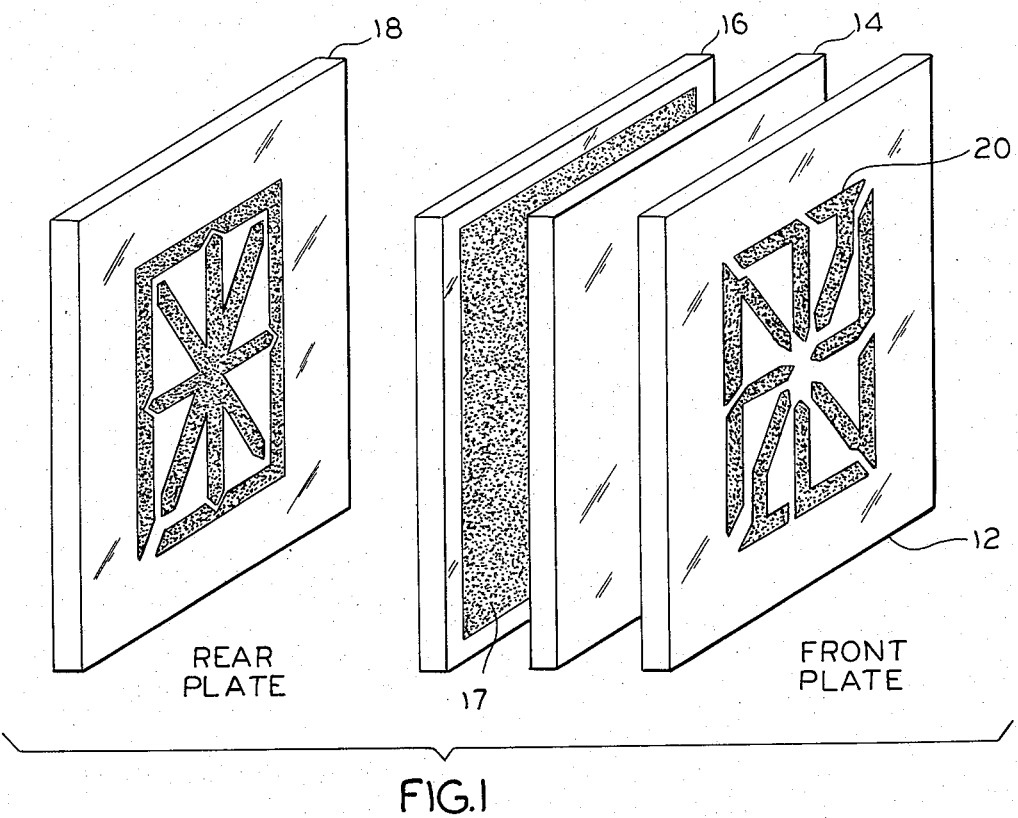
FIG. 1 is an exploded view of the construction of elements to comprise a single character liquid crystal device using my invention.

In FIG. 1, I show my invention as applied to a single character using liquid crystal device or colloidal suspension construction. As seen in FIG. 1, there is the front plate 12 with the present segment configuration, the paired glass plates 14 and 16 with the crystal material and sealant 17 disposed between the two plates as is well-known in the art. The rear plate 18 also has the specific character configuration of my invention.

The segments 20 of the display constitute the elements of the figure eight of the conventional numeric display, wth the horizontal portions for each level, top, middle and bottom, being dual segments. These segments are transparent conductors secured to a respective plate that are chemically coated in any conventional technique such as that of the cited Electronics Magazine article. The center horizontal segments are part of an interior star burst pattern of segments radiating from the center of the character, there being eight radial segments, two horizontal, two vertical, and four other segments disposed 45° from the horizontal and vertical. Thus, there are sixteen segments, eight interior segments in the interior or star burst grouping and eight segments of the outer or peripheral grouping. The outer grouping includes two in-line verticals at each side and two in-line horizontals at the top of the character and two in-line segments at the bottom of the character.

Figure 2:
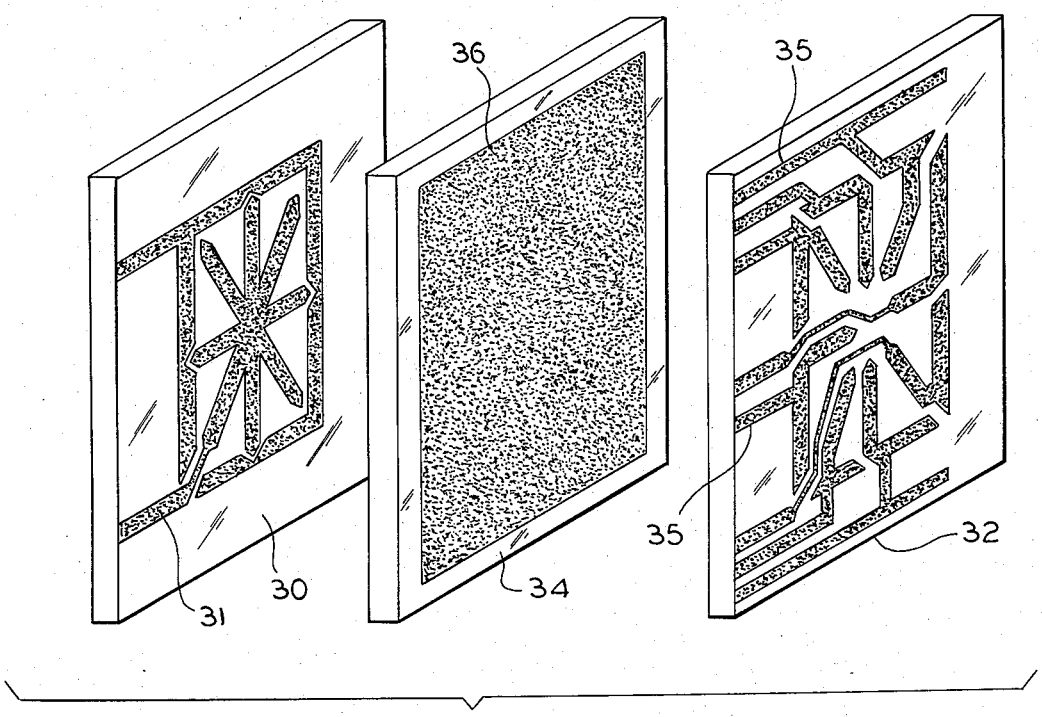
FIG. 2 is an exploded view of the construction elements to comprise a single character colloidal or gas discharge device.

In FIG. 2, I show the construction using my invention in which the optical medium is either colloidal suspension or a gas discharge device. In this embodiment, the rear plate 30 is fabricated of glass and has conductors 31 connected to the segments on one face thereof, the conductors being preferably of tin oxide. The segments 20 of the single character of FIG. 2 are arrayed on the rear plate 30 and the front plate 32. This plate is also fabricated of translucent glass and sandwiched between the two plates is the spacer frit 34 containing the optical medium 36 such as colloidal suspension or gas discharge device. The front plate 32 has the paired segments connected by the conductor multiple 35 to a suitable current source.

Figure 3:
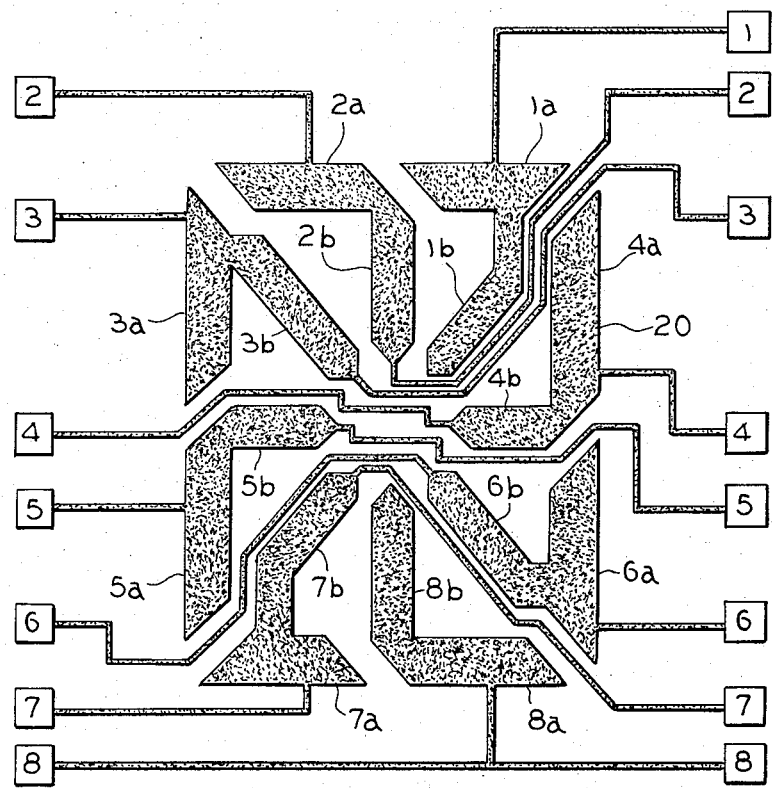
FIG. 3 is a front view in elevation of the layout of front polarizer plate as shown in FIG. 1.

FIG. 3 shows the layout of the segments of the front plate to form eight segment pairings, labeled 1-8. Each pairing includes a segment from the outer grouping and a segment from the inner grouping. Thus, for example, the pairing labeled #1 has a top right horizontal segment (a) of the outer grouping and the segment (b) angled 45° from segment (a). Segment pair 2 includes the top left horizontal (a) segment and the center vertical (b) segment. In a like manner, the segments of the respective pairings 3-8 include an (a) segment and a (b) segment. Each pairing is connected by the conductor shown to a suitable current source (not shown), which may be any suitable source.

Figure 4:
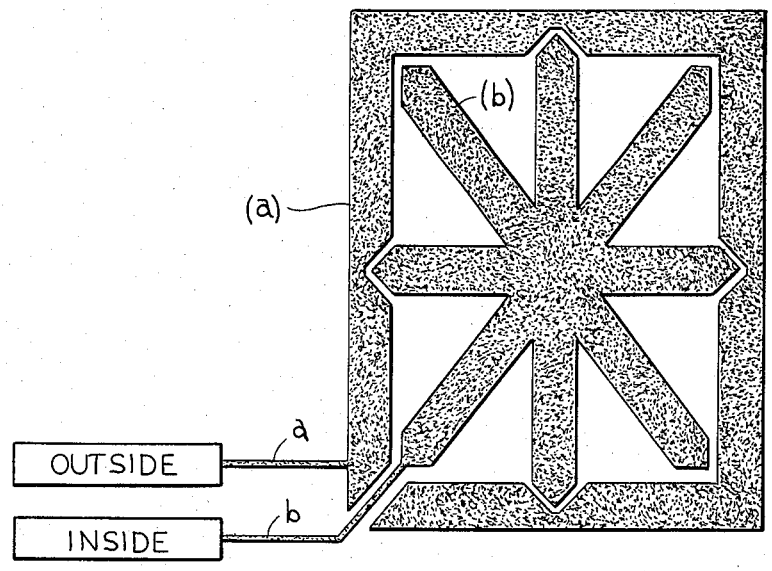
FIG. 4 is a front view in elevation of the layout of the rear polarizer plate of FIG. 1.

FIG. 4 shows the layout of segments on the back plate. The sixteen segments of the back plate are in superimposed alignment with the like segments on the front plate. The segments of the back plate are joined within the groupings labeled "Outside or a" and "Inside or b". The outside segments comprise the peripheral segments and the inside segments comprise the star burst interior pattern. Each of the two groupings as shown is connected by a conductor to its current source.

To display a particular character, a two step or two period multiplexing is undertaken. For example, to produce the letter A and referring to the segments in FIG. 1, it can be seen that segments 5a, 3a, 2a, 1a, 4a, 6a and 4b and 5b would have to be illuminated or visibly driven. Note that these segments are both in the a or outer grouping and b or inner grouping. In the two period driving of the character for the first period, the a or outer grouping of the back plate is driven along with driving of the 1-6 pairs of FIG. 1. During this period, the outer segments 1a, 2a, 3a, 4a, 5a and 6a would be illuminated. During the second time period, the inner or b grouping of the back plate of FIG. 4 is driven while on the front plate only 4 and 5 pairs are driven. During the second period, the center bar is illuminated by driving segments 4 and 5 and the b grouping. As is well-known, due to the high rate at which the character is multiplexed, the letter A appears as the result of these two periods or steps. In a like manner, all alphanumeric characters can be illuminated by an eight-by-two, two period multiplexing. The order set forth for the two steps, i.e., outer and then inner could readily be reversed, if desired.

The eight pair conductors, or eight multiples of the eight-by-two matrix, as it may be called, may be signalled as the eight bits of an address using conventional eight bit computer addressing.

Figure 5:
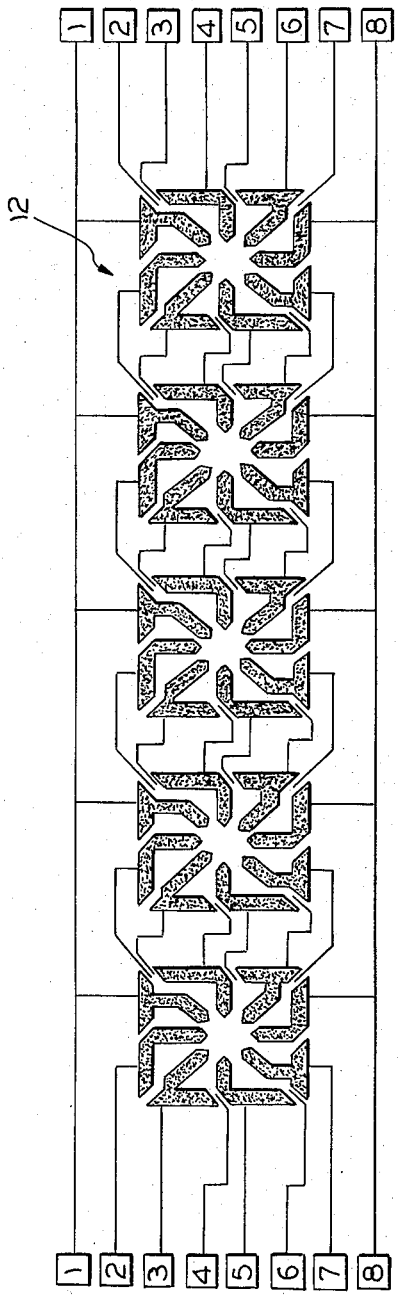
FIGS. 5 and 6 are front views in elevation of the layouts of five character front and rear plates respectively.
Figure 6:
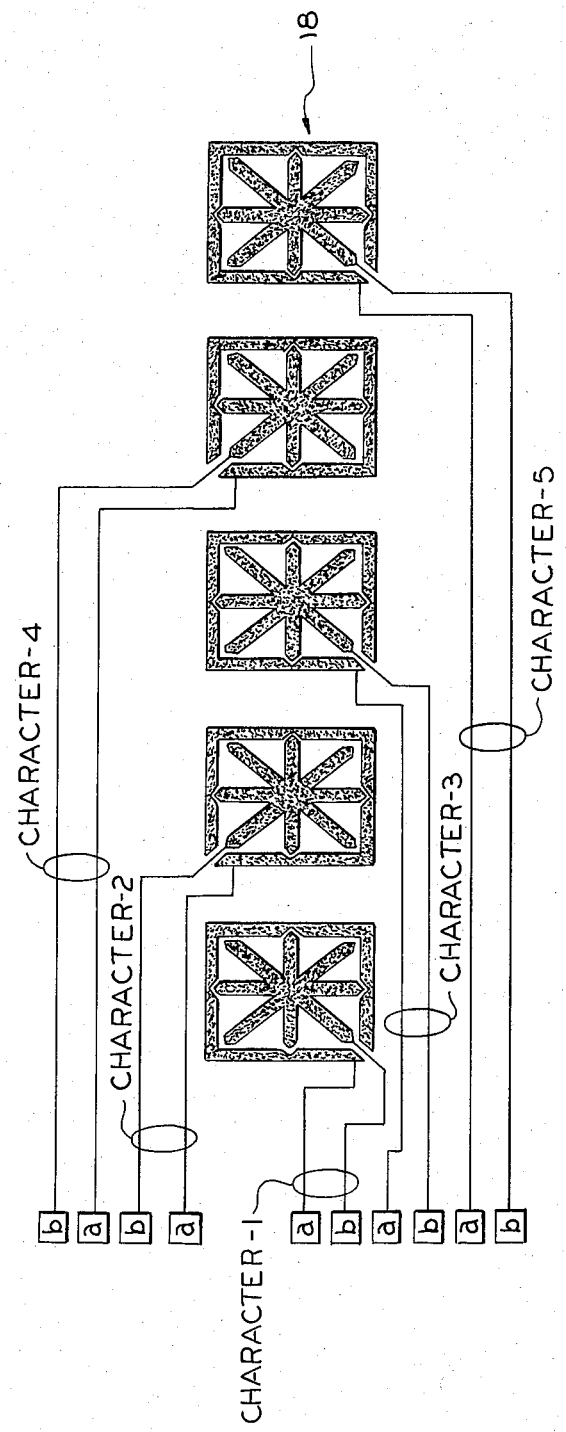

FIGS. 5 and 6 show a five character display, with FIG. 5 showing the front plate and FIG. 6 the rear plate. In these figures, the characters of each plate are identical to one another. In FIG. 5, the pairs are individually coupled by separate conductors 1-8 to the current source (direct cross connection of like interior segments to other characters has been omitted from FIG. 5), and in FIG. 6 the two groups are connected to their respective conductors a and b for each character. In this way, a ten interval sequence of respective a and b periods would constitute a five character frame. During each period, the selected pairs of the front plate would be energized to produce that portion of a character, the characters being driven in sequence from left to right.

Any suitable addressing technique could be used for the selection of desired pairs, the selection data as shown by table A being readily adaptable for storage in a suitable memory, not shown herein. Further, as is well-known, a series of frames would enable the display to be visible to the eye of a viewer as if it were continuously energized.

The table shown herein is only one exemplary form of alphanumeric display. It is clear that other combinations could be used where the shape of a character is in other preferred forms.

TABLE A

|   | a | b |
|---|---|---|
| A | 1-6 | 4,5 |
| B | 1-3,5,7,8 | 1,5,6 |
| C | 1-3,5,7,8 | — |
| D | 1,2,4,6-8 | 2,8 |
| E | 1-3,5,7,8 | 4,5 |
| F | 1-3,5 | 5 |
| G | 1-3,5-8 | 4 |
| H | 3-6 | 4,5 |
| I | 1,2,7,8 | 2,8 |
| J | 1,2,5,7 | 2,8 |
| K | 3,5 | 1,5,6 |
| L | 3,5,7,8 | 0 |
| M | 3-6 | 1,3 |
| N | 3-6 | 3,6 |
| O | 1-8 | — |
| P | 1-5 | 4,5 |
| Q | 1-8 | 6 |
| R | 1-5 | 4-6 |
| S | 1-3,6-8 | 4,5 |
| T | 1,2 | 2,8 |
| U | 3-8 | — |
| V | 3,5 | 1,7 |
| W | 3-6 | 6,7 |
| X | — | 1,3,6,7 |
| Y | — | 1,3,8 |
| Z | 1,2,7,8 | 1,7 |
| 1 | — | 2,7 |
| 2 | 1,2,4,5,7,8 | 4,5 |
| 3 | 1,2,4,6-8 | 3,4 |
| 4 | 3 | |
| 5 | 1-3,7 | 8 |
| 6 | 1-3,5-8 | 4,5 |
| 7 | 2 | 2,8 |
| 8 | 1-8 | 4,5 |
| 9 | 1-4,6-8 | 4,5 |
| 0 | 2,3,5,7 | 2,8 |

What I claim is:

1. A plural character alphanumeric display, in which said display is comprised of two panels in spaced superimposed relationship with an optical medium therebetween, and said characters comprise complementary arrays of conductive segments at plural character locations on both said panels in aligned superimposed relationship adapted to be driven in a pattern by the application of a voltage to selected segments on both of said panels, the invention wherein each of said characters is comprised of a plurality of segments including a first group of segments forming the periphery of the character and a second group of segments radially disposed within the character, there being a like number of segments in each group, and wherein on a first of said panels the segments of the first group of each character are connected for driving connection to a voltage source, and the segments of the second group of each character are connected for driving connection to a voltage source, with the connection from both groups from each character being in multiple with the conductors from the like group of said other characters, and in which on the other panel, the segments of each character are paired with the segment of each pair being in alignment with separate groups within the character and each pairing is connected to a like pairing of the remaining characters for multiplexing of characters in a two step sequence by selective driving of selected pairings simultaneously with selective driving of the first and second groups of respective successive characters to illuminate selected alphanumeric characters at each of said locations.

2. A display as claimed in claim 1, in which said second group includes segments radially disposed and angularly separated by approximately 45° of arc.

3. A display as claimed in claim 1, in which said multiplexing is comprised of segment pairs being selectively driven along with the driving of a group of one character to illuminate segments of selected pairs having a segment in the driven group and thereafter driving a second selection of segments along with the driving of the other group of said one character to illuminate segments of selected pairs and said group and thereby illuminate a selected character at one location and thereafter successively multiplexing selected characters at the remaining locations.

\* \* \* \* \*